US006522263B2

(12) United States Patent
Jones

(10) Patent No.: US 6,522,263 B2
(45) Date of Patent: Feb. 18, 2003

(54) TRAFFIC CONTROL SYSTEM AND KIT

(75) Inventor: Richard D. Jones, Palm Harbor, FL (US)

(73) Assignee: R.D. Jones, Right of Way, Inc., Palm Harbor, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/934,335

(22) Filed: Aug. 21, 2001

(65) Prior Publication Data

US 2001/0054970 A1 Dec. 27, 2001

Related U.S. Application Data

(63) Continuation-in-part of application No. 08/804,415, filed on Feb. 20, 1997, now Pat. No. 6,107,941, which is a continuation of application No. 08/655,556, filed on May 30, 1996, now abandoned, which is a continuation of application No. 08/438,536, filed on May 10, 1995, now abandoned, which is a continuation of application No. 08/275,228, filed on Jul. 14, 1994, now abandoned, which is a continuation of application No. 08/143,376, filed on Oct. 26, 1993, now abandoned, which is a continuation of application No. 07/774,710, filed on Oct. 9, 1991, now abandoned.

(51) Int. Cl.[7] .......................... G08G 1/095; B60Q 7/00

(52) U.S. Cl. .................... 340/915; 340/908; 340/908.1; 340/944; 340/471; 340/473; 116/63 R; 40/612; 362/183

(58) Field of Search ................................ 340/915, 472, 340/908, 471, 908.1, 944, 473, 953; 116/63 R, 63 P; 40/612, 584; 362/183

(56) References Cited

U.S. PATENT DOCUMENTS

| | | | | | |
|---|---|---|---|---|---|
| 4,108,405 | A | | 8/1978 | Gibson | 40/902 |
| 4,777,751 | A | | 10/1988 | Pasquale | 340/908 |
| 4,857,921 | A | | 8/1989 | McBride et al. | 340/912 |
| 6,107,941 | A | * | 8/2000 | Jones | 340/915 |

* cited by examiner

*Primary Examiner*—Donnie L. Crosland
(74) *Attorney, Agent, or Firm*—Larson & Larson, PA; James E. Larson

(57) ABSTRACT

A traffic control system includes a vertically and horizontally disposed pole. The vertically disposed pole has a lower end mounted to a ground surface while an upper end mounts the horizontally disposed pole at a right angle. The horizontally disposed pole extends out over a vehicular roadway and, at least a pair of signal assemblies are mounted to the horizontally disposed pole for controlling vehicular traffic which may pass by an emergency vehicle rescue station. The signal assemblies illuminate a light bulb signal sequence upon activation by a programmable central control panel and instruct vehicular traffic to stop. A receive and antenna receive a wireless signal sent from a remote location within the rescue station. A pair of verification lights mount on the traffic control system and directed towards the rescue station provide a means for indicating to emergency vehicle operators that the illumination sequence is operating properly and that all light bulbs in the signal assembly are illuminating.

15 Claims, 15 Drawing Sheets

TRAFFIC CONTROL SYSTEM AND KIT

PRIOR APPLICATIONS

This is a Continuation-in-Part of Application Ser. No. 08/804,415, filed Feb. 20, 1997, now U.S. Pat. No. 6,107,941, issued Aug. 22, 2000, which is a Continuation of Ser. No. 08/655,556, filed May 30, 1996, now abandoned, which is a Continuation of Ser. No. 08/438,536, filed May 10, 1995, now abandoned, which is a Continuation of Ser. No. 08/275,228, filed Jul. 14, 1994, now abandoned, which is a Continuation of Ser. No. 08/143,376, filed Oct. 26, 1993, now abandoned, which is a Continuation of Ser. No. 07/774,710, filed Oct. 9, 1991, now abandoned.

BACKGROUND OF THE INVENTION

1. Field of Invention

The present invention is generally directed to techniques and systems which are utilized for controlling traffic and, more particularly, to a traffic control system and kit for minimizing risk to fire department and rescue vehicles.

2. Description of the Prior Art

When leaving the station in response to a call, it is becoming increasingly risky for fire department and rescue vehicles to enter traffic. The primary reason for this is directly related to the fact that it is getting more difficult for drivers to hear sirens. In addition, there may be visual distractions for drivers as they approach the front of a station (i.e., new stores, new signs, etc . . . ).

Of particular concern are the ramifications which necessarily flow from the recent phenomenon of consumers demanding a "quieter ride." Automobile and truck manufacturers have made major advancements in this area in the last few years and, at the same time, they have steadily given consumers more control over the climate inside the driver's compartment, Now, drivers have every reason to drive with the windows up which means that cars and trucks have effectively become "moving soundproof rooms."

Furthermore, technological advancements in auto sound equipment such as radios, tape players and CD players, have also complicated the problem. Such equipment generates sound inside the driver's compartment, masking sounds outside the vehicle and serving to distract the mind and promote daydreaming while driving. Naturally, all of this decreases the chance that a siren from a fire department or rescue vehicle will be heard as it leaves the station.

Still additional problems may include limitations on the driver's "field of sight" when approaching the station in a car or truck. Many stations are hidden from view by trees, shrubbery, signs or even other buildings in some cases. Also, the station may be located so close to the roadway that drivers do not have time to react once they see a vehicle leaving the station.

In this connection, drivers are not surprised to see a vehicle in front of the station. Since they might not hear the siren, they must often actually see the lights before it registers that a fire department or rescue vehicle needs the right of way. For this purpose, the most effective solution to the problem is to simply use a traffic signal.

In this connection, a traffic signal can be utilized to control traffic when an emergency vehicle is leaving a station in response to calls. By controlling traffic, it is possible to substantially reduce or at least minimize the risk of potential accidents and avoid costly time delays. Typically, a traffic signal for this purpose has been a device that is "hard wired" which has proven to be undesirable for a number of reasons.

Most importantly, a hard wired traffic signal is extremely expensive to purchase and install. It presents not only a significant "up front" expense but also problems associated with hard wiring signal components together and to electric sources. Still additionally, a hard wired traffic signal is inoperable in the event of any interruption in electrical power service.

As if this were not enough, hard wired traffic signals fail to place control of the signal where it is most needed, i.e., in the hands of the person driving the vehicle. Such signals are generally activated by a button mounted on a wall of the station, and this produces a problem since the driver is forced to communicate his timing with another person. In this connection, the driver is the only one who can quickly evaluate current conditions and accurately forecast his departure from the station.

If the driver has to tell another person to activate the traffic signal, there is room for error which, in this instance, could prove deadly. Quite simply, it is altogether possible that the traffic signal will be activated either too early or too late. For obvious reasons, there may actually be a greater danger in having the traffic signal than in simply relying upon the siren and lights on the vehicle.

The present invention is directed to overcoming one or more of the foregoing problems and achieving one or more of the resulting objects.

SUMMARY OF THE INVENTION

It is a principal object of the present invention to provide a traffic control system and kit for fire department and rescue vehicles. It is a further object of the present invention to provide such a system and kit in a solar operated, remote controlled modular arrangement. It is yet another object of the present invention to provide a traffic control system and kit which is programmable by means of a control panel.

Accordingly, the present invention is directed to a traffic control system having a traffic signal assembly, a traffic sign assembly, a solar panel, and a programmable central control panel. The traffic signal assembly includes a center light housing and a pair of outer light housings disposed on opposite sides thereof, together with means for mounting the traffic signal assembly with the light housings, in a generally horizontal plane. The traffic sign assembly includes a sign having warning information for vehicular and/or pedestrian traffic disposed on one side thereof, together with means for mounting the sign below the center light housing of the traffic signal assembly. The solar panel collects solar energy for delivery to and storage in a battery for illuminating light bulbs in the light housings and it is mounted at a position and in a direction maximizing solar energy collection. The programmable central control panel is operatively associated with the battery for controlling the traffic signal assembly and delivering power from the battery to the traffic signal assembly responsive to a signal from a remote location. With this arrangement, means are also provided for rapidly connecting and disconnecting the components including the traffic signal assembly, battery, solar panel and programmable central control panel in modular fashion.

In a preferred embodiment, the traffic control system includes a receptacle having a light bulb for illumination in each of the light housings. The battery is adapted to supply power for illuminating the light bulbs in the light housings in a manner determined by the programmable central control panel. As an additional feature, the traffic control system includes a sign light for visually enhancing the warning information on the sign.

In a highly preferred embodiment, the traffic control system includes a receiver operatively associated with the programmable central control panel and a mobile transmitter for sending a wireless signal to the receiver for activating the traffic signal assembly on demand. It also advantageously includes a pair of verification lights for indicating activation and proper operation of the traffic signal assembly, together with means for mounting the verification lights at a position and in a direction facing the remote location. Still additionally, the traffic control system includes an audible alarm operatively associated with the programmable central control panel for further warning pedestrian traffic upon activation of the traffic-signal assembly pursuant to the signal from the remote location.

Advantageously, the traffic control system includes a photocell mounted at a position for continually measuring light conditions and the photocell is operatively associated with the sign light and the programmable central control panel for operating the sign light only under selected light conditions.

The programmable central control panel preferably includes means for operating in an initial phase with only the light bulb in the center light housing flashing at a predetermined flash rate for a selected period of time. Also, the programmable central control panel preferably includes means for operating in a final phase with only the light bulbs in the outer light housings flashing at a predetermined flash rate for a selected period of time.

When the traffic control system is in kit form, the light housings each have an opening covered by a removable colored lens with the lenses including at least three yellow lenses and at least two red lenses. The light housings also each have a lens hood disposed about the removable colored lenses. Further, the traffic signal assembly includes a backboard having three openings symmetrically spaced and sized and shaped so as to be in conformity with and disposed about the light housings.

In kit form, the traffic control system also includes a pair of signs having warning information for vehicular and/or pedestrian traffic disposed on one side thereof. The signs advantageously comprise an international fire truck crossing sign and a stop here on red sign with a yellow lens being utilized for each of the light housings for transmitting a yellow light therefrom in a warning deployment (with the international fire truck crossing sign) and a yellow lens being provided for transmitting a yellow light from the center light housing and a red lens being provided for transmitting a red light from each of the outer light housings in a stop deployment (stop here on red sign). With these alternatives available from the kit, the lights may be made to operate as determined by the programmable central control panel in one of several different operational modes.

Preferably, the programmable central control panel includes means for operating in the warning deployment in an initial phase with only the yellow light in the center light housing flashing at a predetermined flash rate for a selected period of time. Advantageously, the programmable central control panel also includes means for operating in the warning deployment in a final phase with only the yellow light in the outer light housings flashing at a predetermined flash rate for a selected period of time.

Alternatively, the programmable central control panel includes means for operating in the stop deployment in an initial phase with only the yellow light in the center light housing flashing at a predetermined flash rate for a selected period of time. The programmable central control panel then also advantageously includes means for operating in the stop deployment in an intermediate phase with only the yellow light in the center light housing being continuously illuminated for a selected period of time. When so operated, the programmable central control panel further includes means for operating in the stop deployment in a final phase with only the red lights in the outer light housings flashing at a predetermined flash rate for a selected period of time.

In an even more preferred embodiment, a first and second pole are employed with the present invention. The first pole extends in a vertical plane from an edge of a road surface proximal to a fire or rescue station and supports the programmable central control panel. The second pole extends out over the road surface and supports the light assembly/assemblies.

Other objects, advantages and features of the present invention will become apparent from a consideration of the following specification taken in conjunction with the accompanying drawings.

DETAILED DESCRIPTION OF THE PREFERRED EMBODIMENTS

Figure 1:
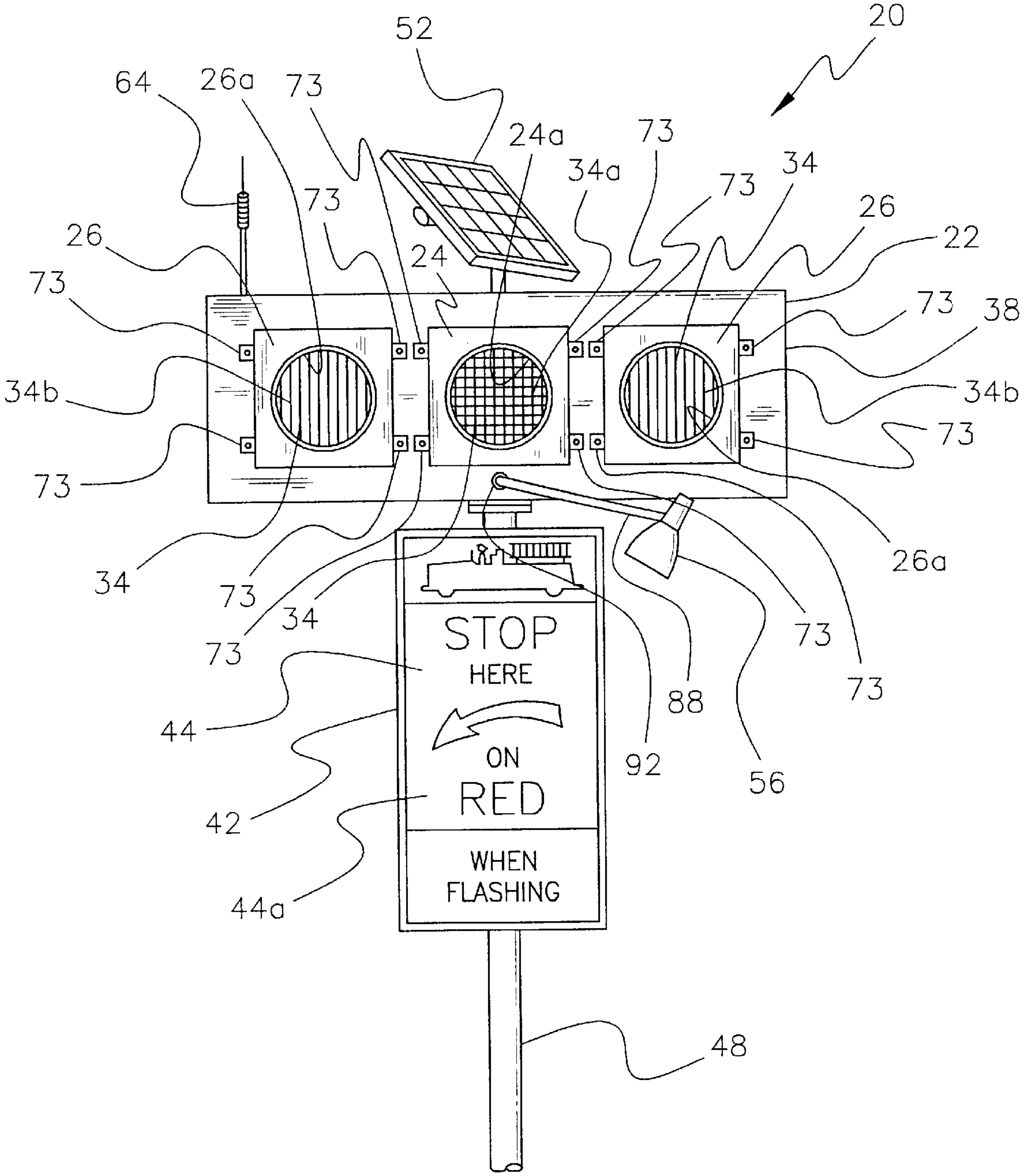
FIG. 1 is a front elevational view of a first embodiment of traffic control system in accordance with the present invention.

In the illustrations given, and with reference first to FIG. 1, the reference numeral 20 designates generally a traffic control system embodying features in accordance with the present invention. The traffic control system 20 will be seen to include a traffic signal assembly 22 having a center light housing 24 and a pair of outer light housings 26 on opposite sides thereof, together with means 28 (see FIG. 4) for mounting the traffic signal assembly 22 with the light housings 24 and 26 in a generally horizontal plane (see, also, FIG. 5). As will be appreciated by referring to FIG. 4, the traffic control system 20 further includes a receptacle such as 30 having a light bulb such as 32 for illumination in each of the light housings 24 and 26.

Referring once again to FIG. 1, the light housings 24 and 26 of the traffic signal assembly 22 each have an opening 24*a* and 26*a,* respectively. It will also be seen and appreciated that the openings 24*a* and 26*a* in the light housings 24 and 26, respectively, are each covered by a colored lens 34. Referring again to FIG. 9, the light housings 24 and 26 also each have a lens hood such as 36 (see FIG. 4) disposed about the colored lens 34 thereof.

As shown in FIGS. 1 and 3 through 5, the traffic signal assembly 22 further includes a backboard 38 having three openings 40 therethrough. The openings 40 are symmetrically spaced in the backboard 38 substantially as shown. As will be appreciated, the openings 40 are sized and shaped so as to be in conformity with the light housings 24 and 26 for general registration therewith.

Figure 4:
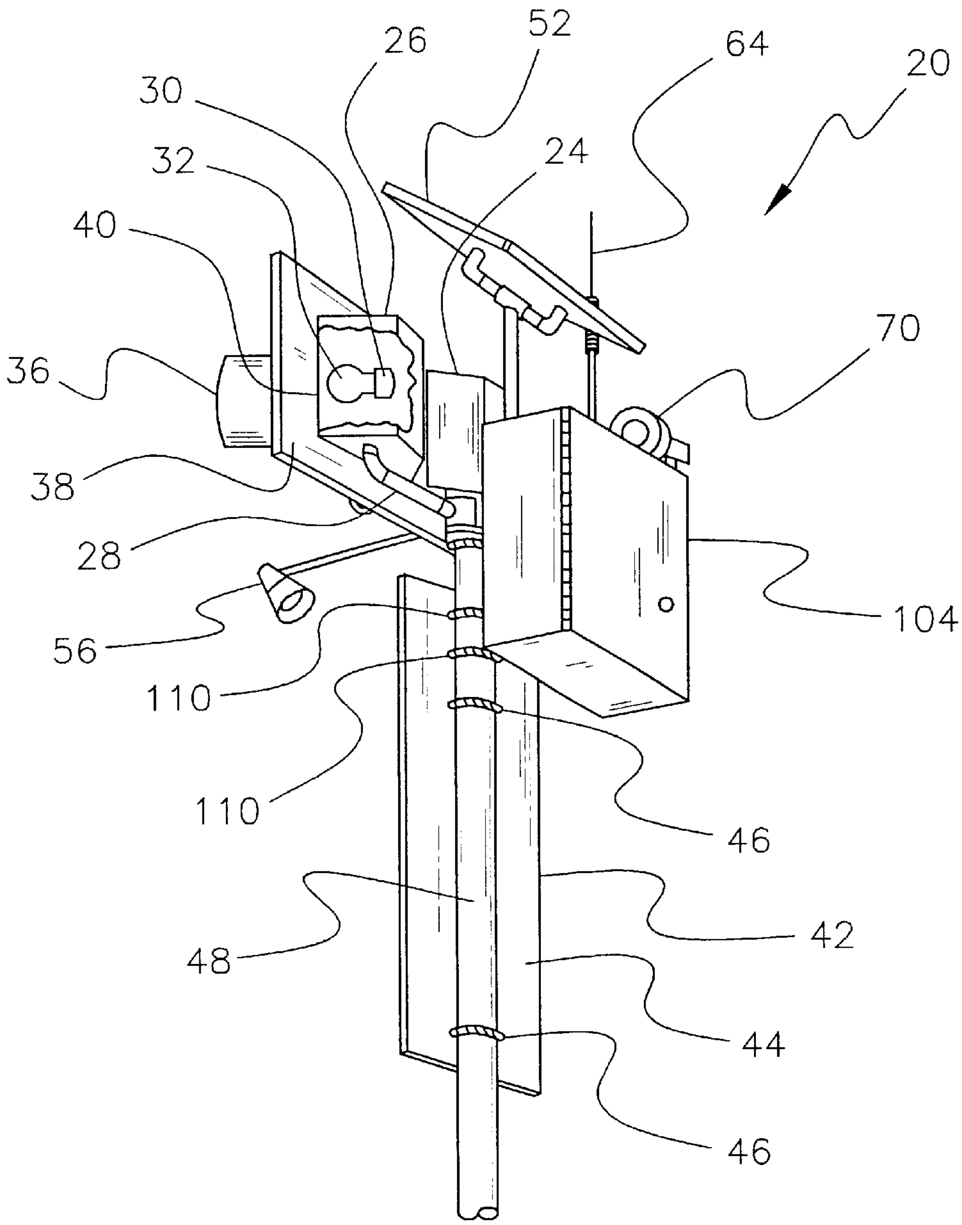
FIG. 4 is a rear perspective view of the traffic control system illustrated in FIG. 1.

As best shown in FIGS. 1 and 4, the traffic control system 20 includes a traffic sign assembly 42 positioned below the traffic signal assembly 22. The traffic sign assembly 42 include a sign 44 having warning information for vehicular and/or pedestrian traffic deposed on one side 44*a* thereof. In addition, means are provided for mounting the sign 44 directly below the center light housing 24 of the traffic signal assembly 22.

As shown in FIG. 4, the mounting means may advantageously take the form of bands 46 which are integrally associated with the sign 44 to extend about and be secured to a mounting pole 48.

Figure 7:
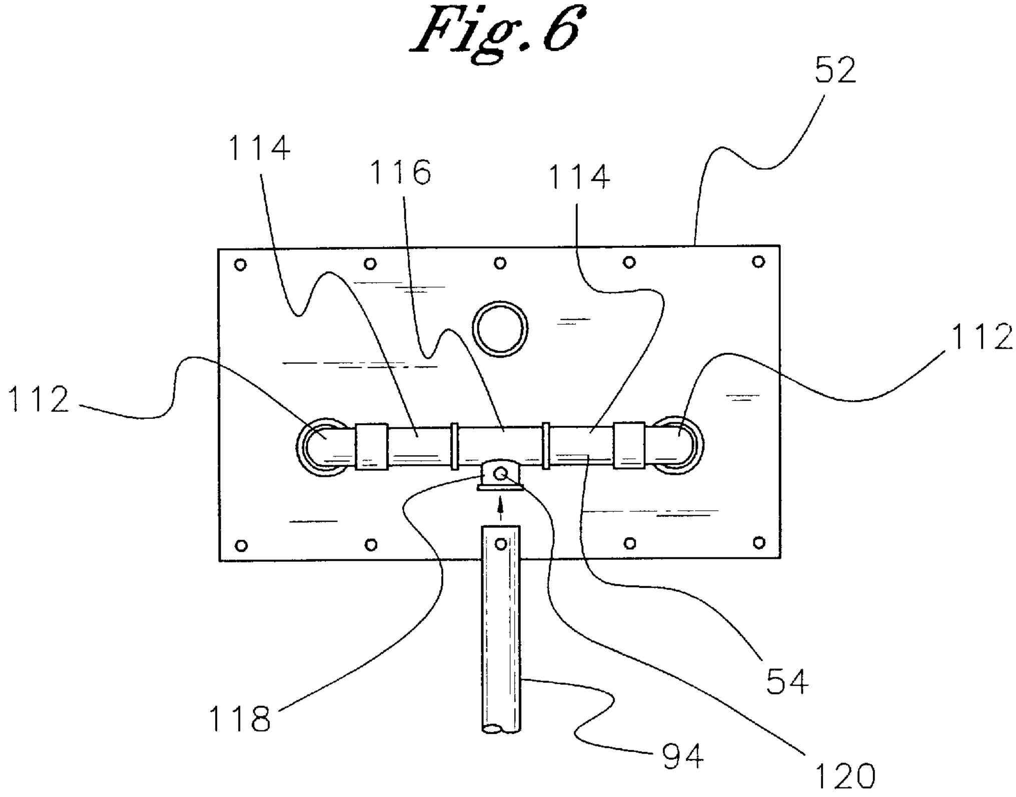
FIG. 7 is a rear elevational view of the solar panel for the traffic control system of the present invention.
Figure 8:
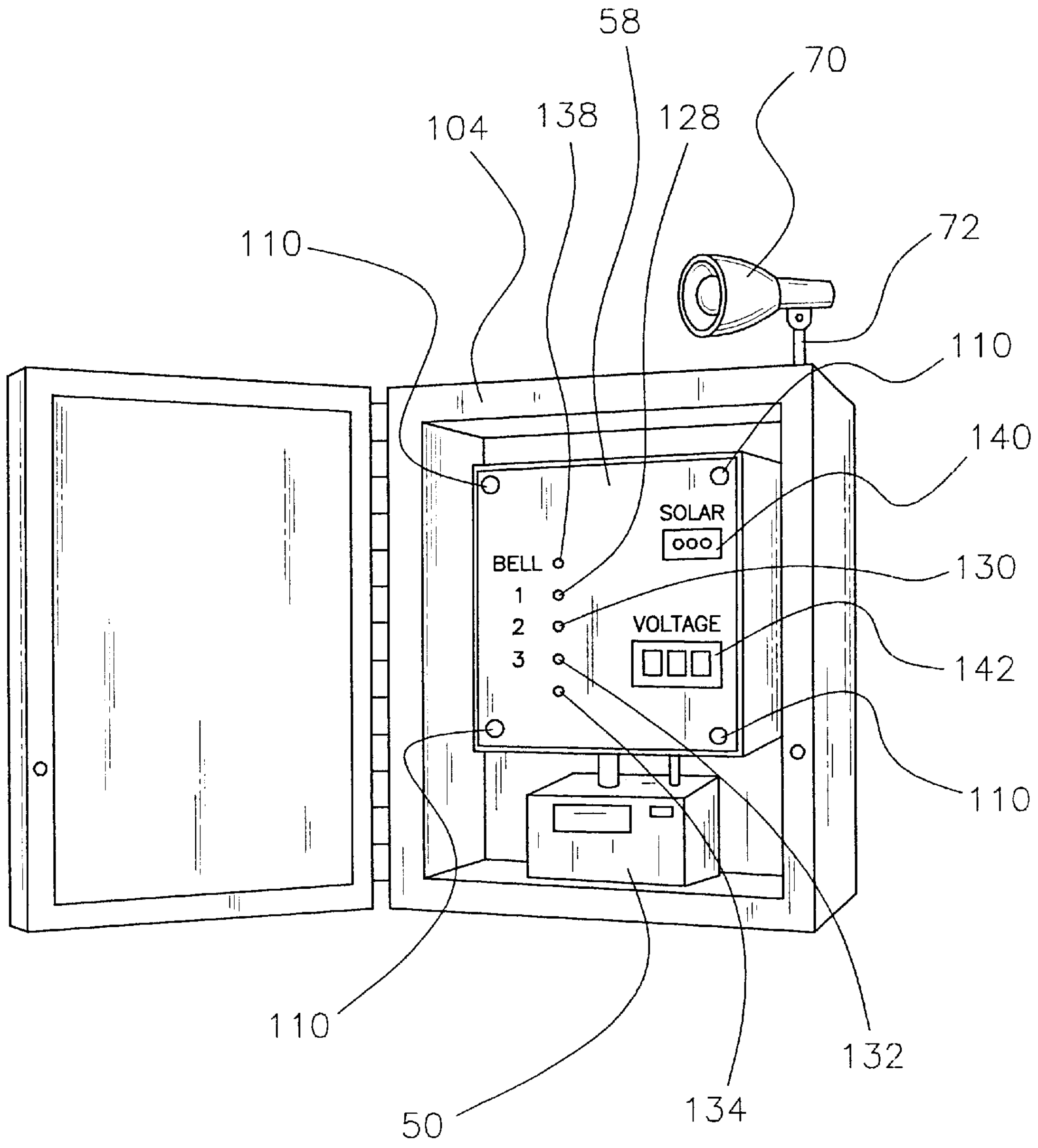
FIG. 8 is a front perspective view of a control panel for the traffic control system of the present invention.
Figure 9:
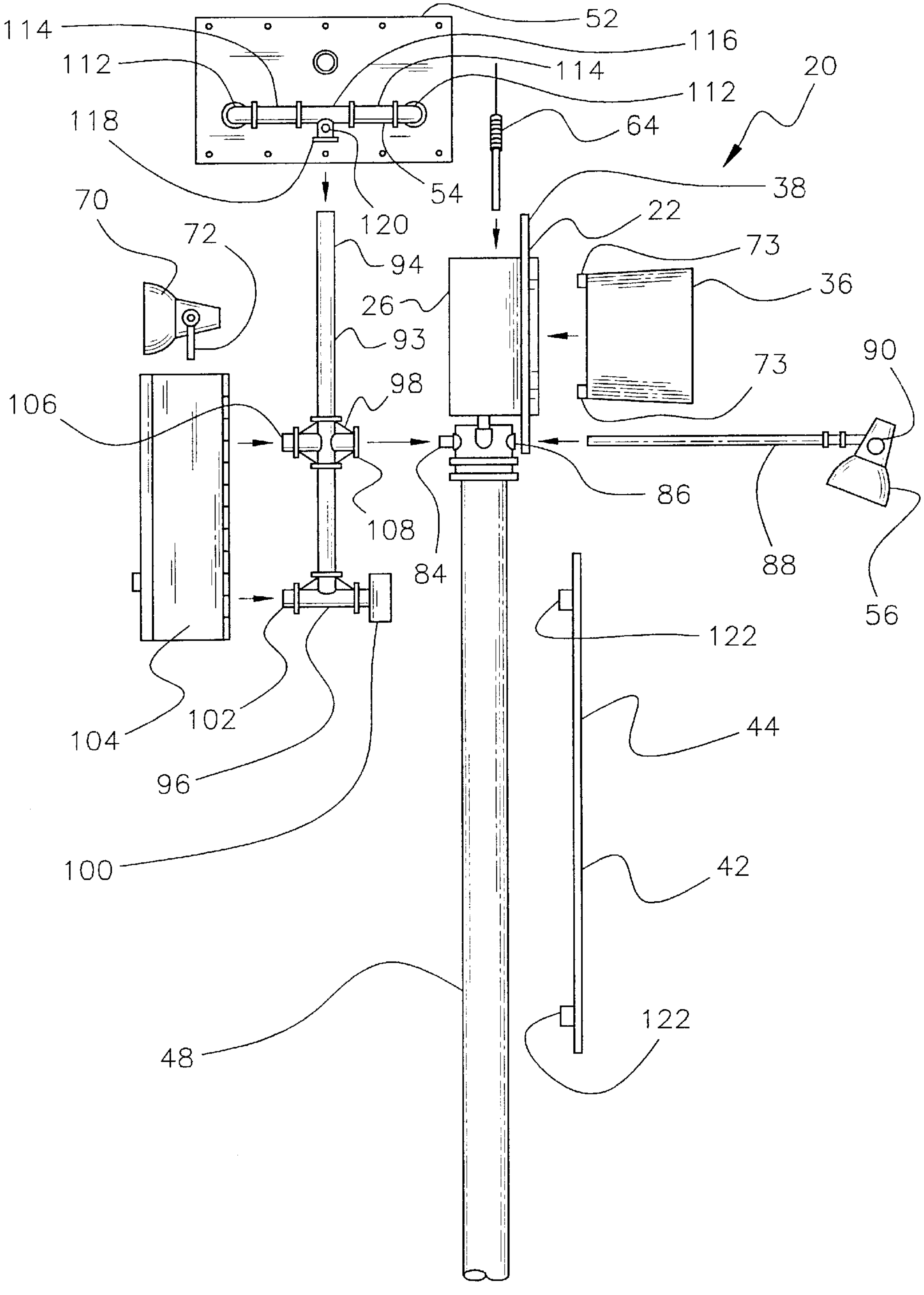
FIG. 9 is an exploded side elevational view of the traffic control system illustrated in FIG. 1.
Figure 10:
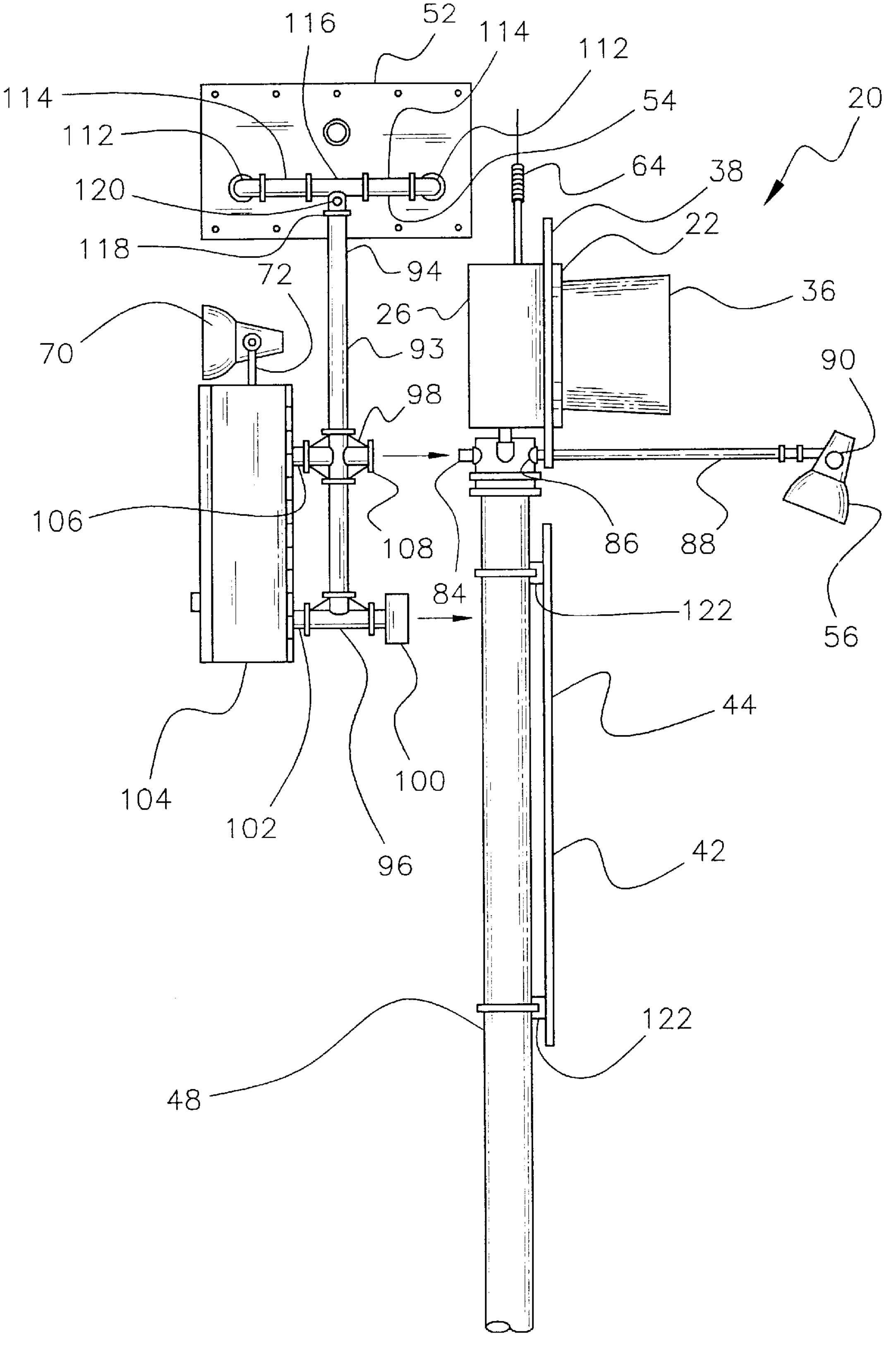
FIG. 10 is a partially exploded side elevational view of the traffic control system illustrated in FIG. 2.

Referring to FIG. 8, the traffic control system 20 includes a battery 50 for supplying electrical power for illuminating the bulbs such as 32 in the light housings 24 and 26. It will also be seen from FIGS. 1, 3, 4, 6, 9 and 10 that the traffic control system 20 will include a solar panel 52 for collecting solar energy for delivery to and storage in the battery 50 for illuminating the bulbs such as 32 in the light housings 24 and 26. Referring to FIGS. 7, 9 and 10, the traffic control system 20 will further include means 54 for mounting the solar panel 52 at a position and in a direction to maximize solar energy collection.

With reference now to FIGS. 1, 4, 9 and 10, the traffic control system 20 also includes a sign light 56 for visually enhancing the warning information on the sign 44. As shown in the drawings, the sign light 56 is mounted above and directed toward the one side 44*a* of the sign 44 (see, especially, FIGS. 4, 9 and 10).

Figure 3:
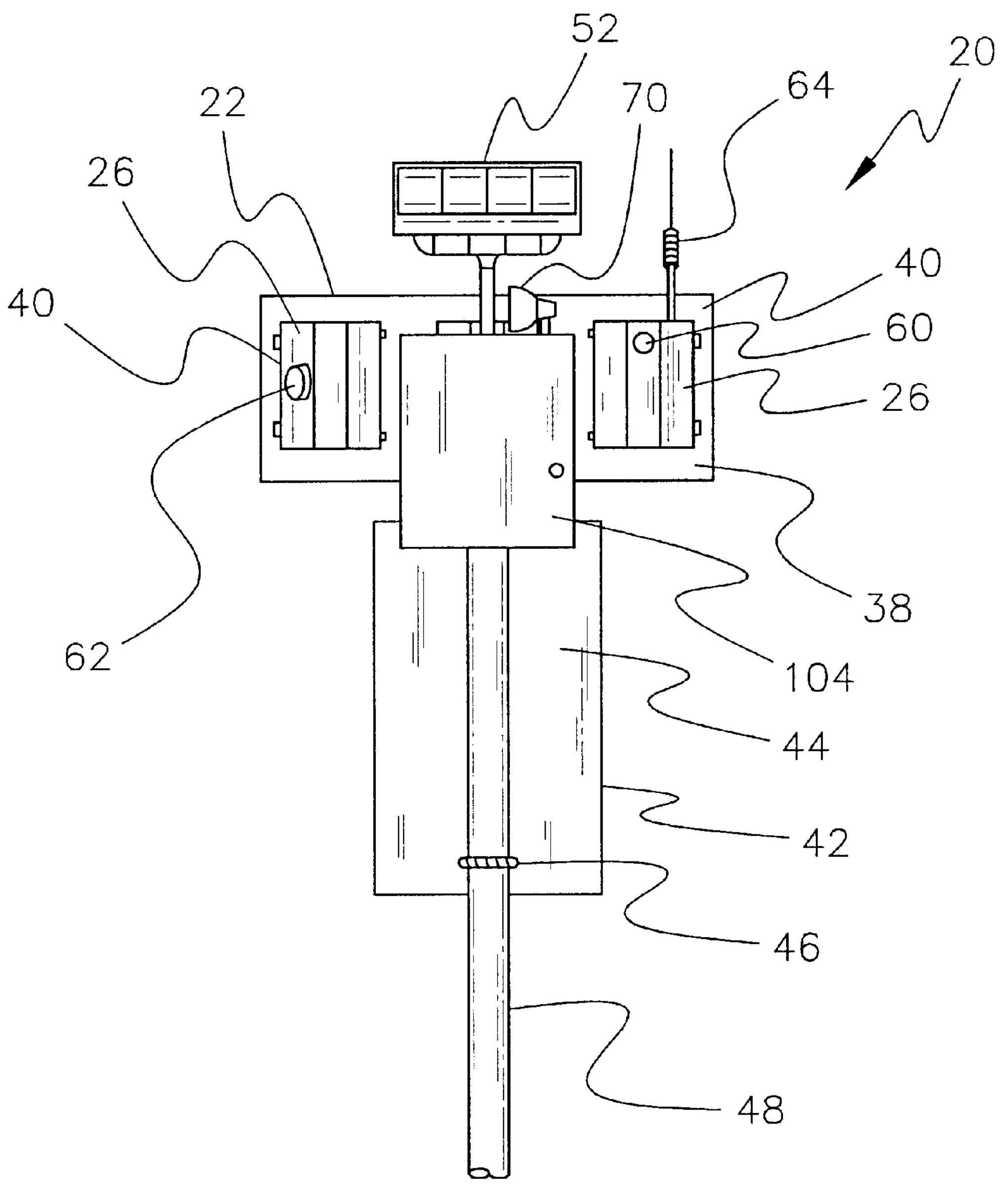
FIG. 3 is a rear elevational view of the traffic control system illustrated in FIG. 1.
Figure 5:
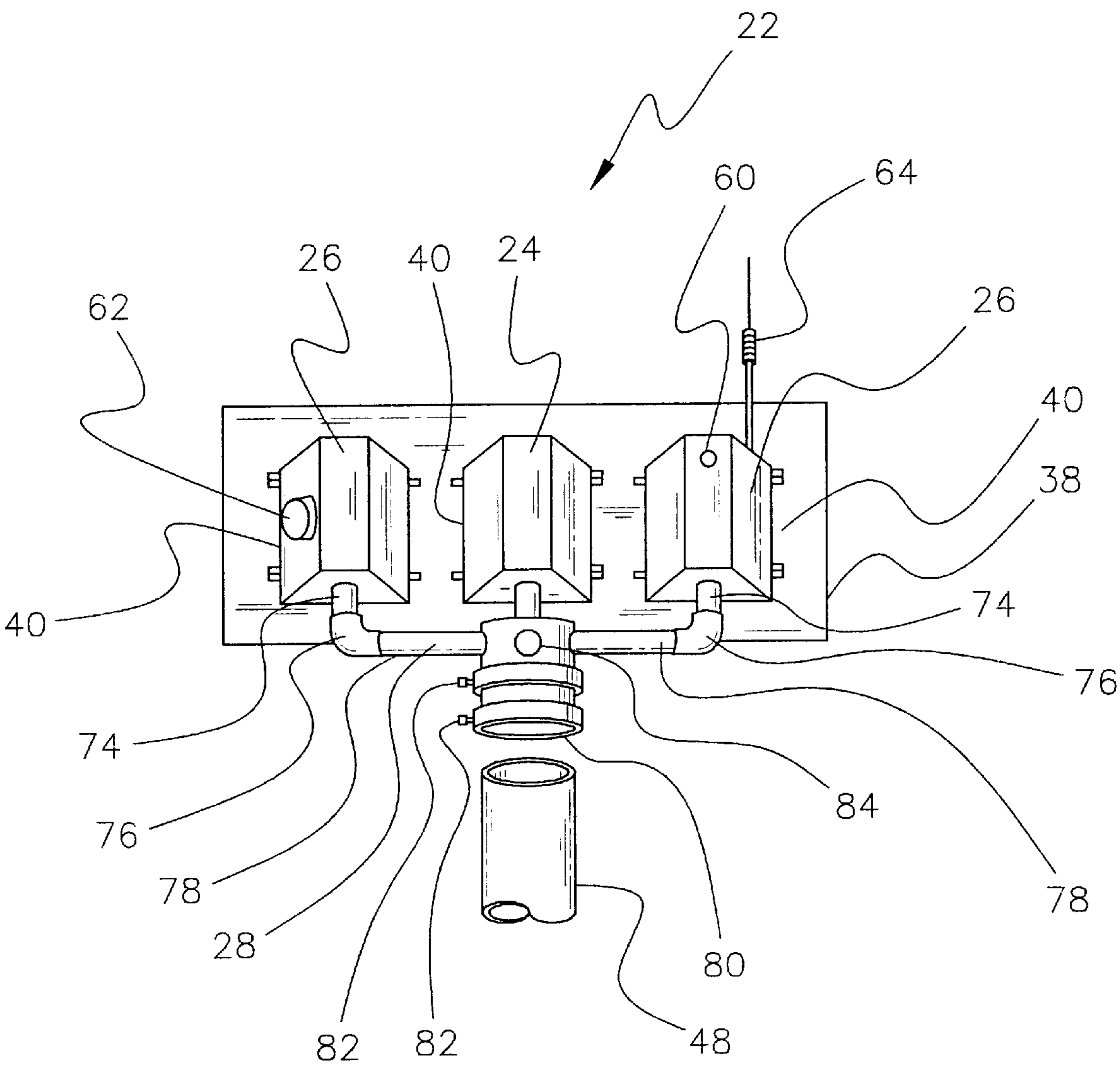
FIG. 5 is a rear perspective view of a traffic signal assembly for the traffic control system of the present invention.
Figure 6:
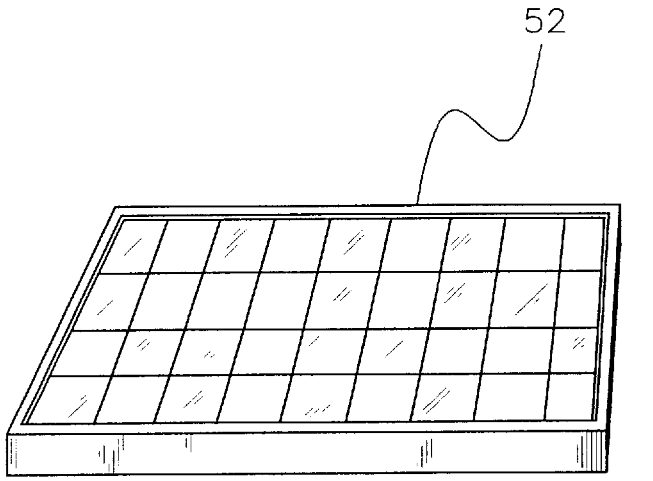
FIG. 6 is a front perspective view of a solar panel for the traffic control system of the present invention.

Referring to FIG. 8, a programmable central control panel 58 is operatively associated with the battery 50 for controlling the traffic signal assembly 22 and delivering power from the battery 50 to the traffic signal assembly 22 responsive to a signal from a remote location. It will also be seen, especially from FIGS. 3 and 5, that the traffic control system 20 advantageously includes a photocell 60 at a position for continually measuring light conditions wherein the photocell 60 is operatively associated with the sign light 56 and the programmable central control panel 58 for operating the sign light 56 only under selected light conditions. As also shown in FIGS. 3 and 5, an audible alarm 62 is operatively associated with the programmable central control panel 58 for further warning pedestrian traffic upon activation of the traffic signal assembly 22 pursuant to the signal from the remote location.

Figure 11:
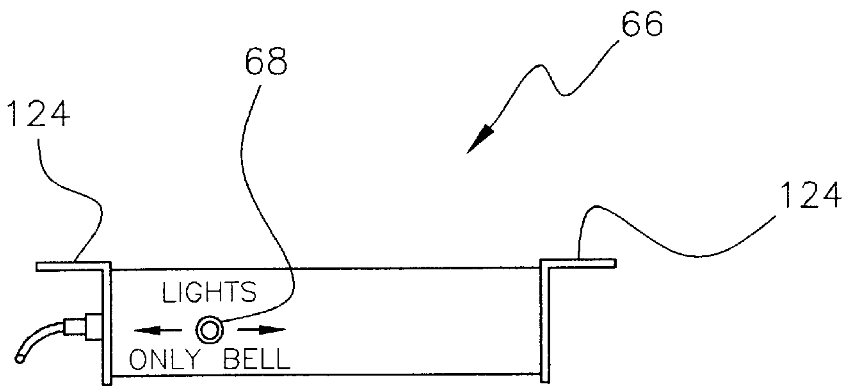
FIG. 11 is a top plan view of a wireless transmitter for the traffic control system of the present invention.
Figure 12:
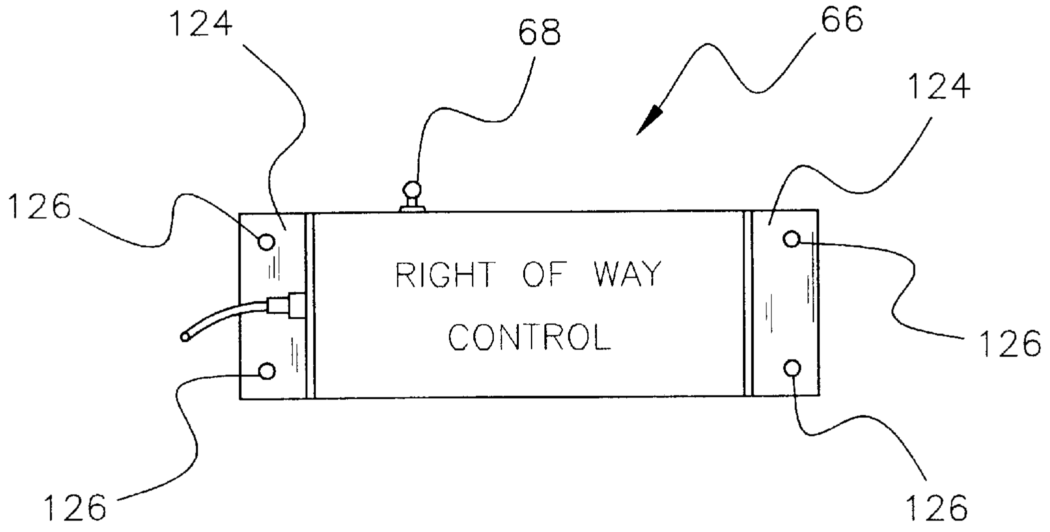
FIG. 12 is a front elevational view of the wireless transmitter illustrated in FIG. 11.

As will be appreciated by referring to FIGS. 1, 3 through 5, and 8 through 12, the traffic control system 20 includes an antenna 64 associated with the traffic assembly 22 to carry a signal to a receiver 58*a*. This receiver 58*a* may suitably be made integral with the programmable central control panel 58 and a wireless transmitter 66 may be provided for sending the signal from the remote location to the receiver through the antenna 64 for activating the traffic signal assembly 22. As shown in FIGS. 11 and 12, the wireless transmitter=may advantageously include a toggle switch 68 having a "center-off" position, a "lights only" position and a "lights and bell" position.

In view of the foregoing, it will be appreciated that the wireless transmitter 66 is adapted to send a signal from a remote location to the receiver for activating the traffic signal assembly 22 either alone or with the audible alarm 62.

Referring now to FIGS. 3, 4 and 8 through 10, the traffic control system 20 also includes a verification light 70 for indicating activation and proper operation of the traffic signal assembly 22. The verification light 70 also operated in response to a signal from the wireless transmitter 66. With specific reference to FIG. 8, means 72 for mounting the verification light 70 is provided for positioning and directing the verification light 70 in such a manner as to face the remote location.

Referring to FIGS. 1, 5, 7 through 9, 11 and 12, the traffic control system 20 includes means for rapidly connecting and disconnecting the traffic signal assembly 22, battery 50, solar panel 52, light 56 and programmable central control panel 58 in modular fashion. It will be seen in this connection that these comprise the principal components, in addition to the sign 44, and render installation an extremely inexpensive matter once a pole 48 has been properly positioned and mounted in the ground. After this has been done, the remaining components of the traffic control system 20 can be assembled in a rapid fashion and can be fully installed without the need for an electrician or any other especially trained personnel.

As for installation, the backboard 38 may be secured to the remainder of the traffic signal assembly 22 by utilizing a suitable array of snap fit connectors 73 as perhaps best shown in FIG. 1. next, the lens hoods such as 36 may be inserted into position in the light housings 24 and 26 where they may also be secured by means of suitable snap fit connectors such as 73*a* (see FIG. 9). After the antenna 64 has been threaded into a suitable coaxial fitting in the respective light housing 26, the traffic signal assembly may be-placed on the pole 48 substantially as shown in FIG. 5.

As there illustrated, the mounting means 28 may advantageously include a plurality of vertical pipe sections 74 extending from the bottom of each of the light housings 24 and 26. The pipe sections 74 associated with the light housings 26 have elbows 76, together with horizontal pipe sections 78 that are integrally associated with a vertical collar 80 which is sized to slip over the top of the pole 48 and to be secured thereto by means of set screws 82. As will be appreciated, the vertical pipe section 74 associated with the center light housing 24 is directly integral with the collar 80 substantially as shown in FIG. 5.

Still referring to FIG. 5, the photocell 60 and the audible alarm 62 may be preassembled in the respective light housings 26. It will also be appreciated that the wiring for the receptacles 30, photocell 60, audible alarm 62, and antenna 64 may be provided in harness fashion so as to extend through a horizontal pipe fitting 84, and it may have a suitable plug or receptacle to meet with a similar, mating plug or receptacle associated with the programmable central control panel 58 so as to electrically interconnect the various components along with the controls therefor. As will be appreciated, the details of the wiring including the exact nature of the harness connectors will be well within the abilities of those who are skilled in this art.

After the traffic signal assembly 22 has been properly assembled and installed on the top of the pole 48, the sign light 56 may next be installed. This may be accomplished, as suggested by FIG. 9, by having a threaded fitting 86 extending from the collar 80 to receive a threaded pipe 88 which supports the sign light 56 by means of a pivotal connection 90 at its remote end and the threaded pipe 88 carries suitable wiring which may again be provided with a plug or receptacle to meet with a suitable corresponding receptacle or plug in the programmable central control panel 58. As will be appreciated from FIG. 1, the pipe 88 will suitable extend through an opening 92 in the backboard 38 which is aligned with the threaded fitting 86 for this purpose.

After the sign light has been installed, the mounting structure 93 which includes a vertical pipe 94 having a lower fitting 96 and an intermediate fitting 98 is suitably installed as suggested by FIG. 9. The lower fitting 96 will be seen to have a plate 100 curved to conform to the curvature of the pole 48 and a threaded extension 102 to pass through a hole in the control box 104 for cooperation with a correspondingly threaded fastener such as a nut or the like. As for the intermediate fitting 98, it includes a threaded extension 106 to pass through another hole in the control box 104 for cooperation with another threaded fastener such as a nut or the like.

Directly opposite the threaded extension 106 of the intermediate fitting 98 is another extension 108 adapted to cooperate with the fitting 84 extending from the collar 80. It does this in such a manner as to permit the wiring harness for the components comprising the traffic signal assembly 22 and the sign light 56 to extend through the intermediate fitting 98 and into the control box 104 where it may be electrically interconnected in plug and receptacle fashion to the programmable central control panel 58. As will be appreciated by referring to FIG. 4, the curved plate 100 of the lower fitting 96 is utilized in combination with a pair of bands 110 to assist in securing the mounting structure 93 to the pole 48.

As already suggested, the control box 104 may have preformed holes in the back wall thereof to receive the threaded fittings 102 and 106. It is then possible for the control box 104 to be secured to the mounting structure 93 (after the latter has ben secured to the pole 48) by means of threaded fasteners for the various components extending into the control box 104. When this has been done, the wiring harness or harnesses may simply be plugged into the rear of the programmable central control panel 58.

After this has been done, the programmable central control panel 58 may be secured to the control box 104 by means of a plurality of fasteners 110 which may be of any conventional type requiring ordinary tools or the like.

As shown in FIG. 7, the solar panel 52 is advantageously secured directly to the top of the pipe 94 of the mounting structure 93. It will be seen that the mounting means 54 for the solar 52 comprises a suitable pipe and fitting arrangement comprising elbows 112, pipe sections 114, and a T-fitting 116 having a downwardly extending collar 118 adapted to cooperate with the top of the vertical pipe 94 of the mounting structure 93. By utilizing threaded pipe fittings, the solar panel 52 can be mounted at a position and in a direction maximizing solar energy collection.

If desired, the downwardly extending collar 118 can be threaded for cooperation with threads on the top of the pipe 94 of the mounting structure 93; alternatively, and as shown, the collar 18 can simply slide onto the top of the pipe 94 of the mounting structure 93. In the illustrated form, and following proper positioning of the solar panel 52 for collection of solar energy, a set screw 120 can be utilized to secure the solar panel 52 in a desired position. As with the other components, the solar panel 52 can be provided with a suitable wiring harness which can extend through the mounting structure 93 into the control box 104 to be plugged into the battery 50 such that solar energy can be delivered to and stored in the battery 50.

As for the next stop, the sign 44 can be installed on the pole 48 as illustrated in FIG. 1. The sign 44 may suitably include fittings 122 (see FIG. 9) on the side opposite that having warning information thereon which cooperate with the bands 46 shown in FIG. 4, In this manner, the sign 44 may be mounted directly below the center light housing 24 of the traffic signal assembly 22.

As a final step, the wireless transmitter 66 may be installed in a fire department or rescue vehicle. This may be done by utilizing angle brackets 124 having holes 126 therein to accommodate fasteners such as self tapping screws or the like (not shown). By way of example, the wireless transmitter 66 may be mounted on the dashboard of a fire department or rescue vehicle.

As will be appreciated by referring to FIG. 1, the sign 44 comprises a stop here on red sing. It will also be seen that the colored lenses of the traffic signal assembly 22 include a yellow lens 34*a* for transmitting a yellow light from the center light housing 24. In addition, a red lens 34*b* is provided for transmitting a red light from each of the outer light housings 26.

Referring to FIG. 8, the programmable central control panel 58 includes means such as a toggle switch 128 for operating in an initial phase with only the yellow light in the center light housing 24 flashing at a predetermined flash rat for a selected period of time. It will also be seen that the programmable central control panel 58 includes means such a toggle switch 130 for operating in an intermediate phase with only the yellow light in the center light housing 24 being continuously illuminated for a selected period of time. Further, the programmable central control panel 58 includes means such as a toggle switch 132 for operating in a final phase with only the red lights in the outer light housings 26 flashing at a predetermined flash rate for a selected period of time.

In accordance with the invention, the toggle switch 128 is advantageously capable of setting the selected period of time for the yellow light in the center light housing 24 to flash for either approximately five seconds or approximately ten seconds. The toggle switch 130 is advantageously capable of setting the selected period of time for the yellow light in the center light housing 24 to be continuously illuminated for approximately five seconds only. Additionally, the toggle switch 132 is advantageously capable of setting the selected period of time for the red lights in the outer light housings 26 to flash for either approximately twenty seconds or approximately thirty seconds.

By providing these options, it is possible to set the traffic control system 20 to operate ibn an optimum manner for the traffic conditions in a given location.

If desired, an additional toggle switch 134 may be provided to cause the red lights in the outer light housings 26 to either flash simultaneously or in wig-wag fashion. It will be appreciated, of course, that the wiring for the programmable central control panel 58 wherein the various switches 128, 130, 132 and 134 are provided for controlling the duration of flashing and/or type of flashing is well within the skill of those in the art, and, thus, has not been described so as to avoid unduly extending the description. In fact, it will be readily appreciated that the wiring for this purpose may take any of a variety of different forms all of which will accomplish the exact same result.

The programmable central control panel 58 may include an additional toggle switch 138 which may either be set to permit activation of the audible alarm 62 by means of the transmitter 66 or to render it impossible to do so where the audible alarm 62 need not or should not be utilized. It will also be seen that the programmable central control panel 58 may include a solar charge indicator 140 as well as a voltage meter 142 to give an indication of the operation of the solar collector 52 as well as the level of charge of the battery 50 at any point in time. In a highly preferred embodiment, the battery 50 comprises a source of direct current electrical power and the programmable central control panel 58 includes an invertor for converting the direct current electrical power to alternating current electrical power.

As will now be appreciated, the assembly and installation of the present invention may be done in an inexpensive manner by inexperienced personnel. The rapid connect and disconnect means includes threaded fittings and connectors, snap fittings and connectors, and mating plug and receptacle for modular on site assembly with limited tools. As a result, the traffic control system 20 is extremely economical yet highly effective for its intended purpose as well as user friendly.

Figure 2:
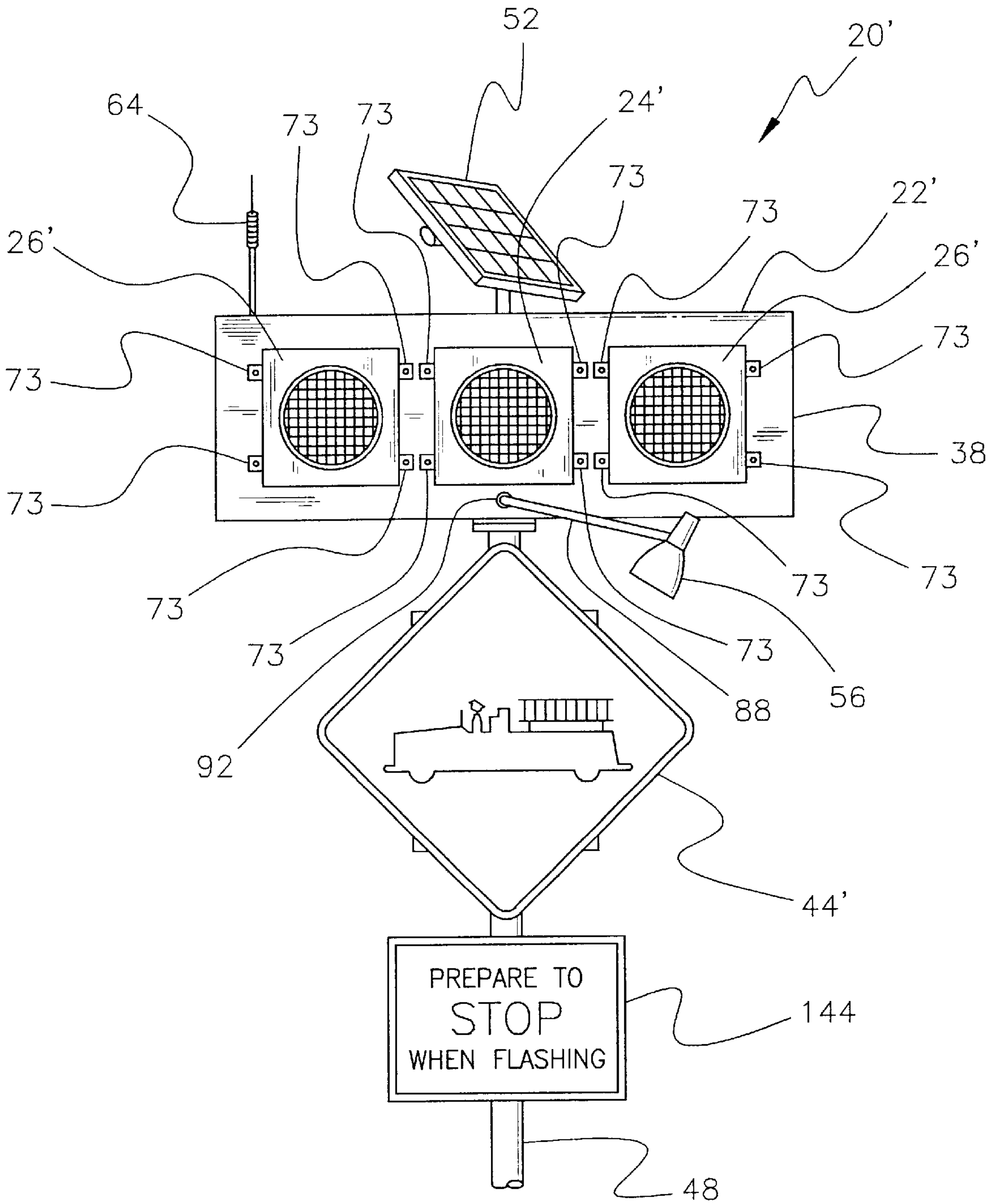
FIG. 2 is a front elevational view of a second embodiment of traffic control system in accordance with the present invention.

Referring to FIG. 2, the traffic control system 20' is quite similar to the traffic control system 20 but differs however in that the colored lenses of the traffic signal assembly 22' include a yellow lens in each of the light housings 24' and 16'. Thus, the light housings 24' and 26' all transmit yellow lights which are operable as determined by the programmable central control panel (such as 58 in FIG. 8). In addition, the traffic control system 20' has a sign 44' which comprises an international fire truck crossing sign in place of the sign 144 which comprised a prepare to stop when flashing warning (see FIG. 1).

For the embodiment which has been illustrated in FIG. 2, the programmable central control panel such as 58 includes a toggle switch such as 128 for causing operation of the traffic signal assembly 22' in an initial phase with only the yellow light in the center light housing 24' flashing at a predetermined flash rate for a selected period of time. Also, for the embodiment which has been illustrated in FIG. 2, the programmable central control panel such as 58 includes a toggle switch such as 132 for causing operation of the traffic signal assembly 22' in a final phase with only the yellow lights in the outer light housings 26' flashing at a predetermined flash rate for a selected period of time.

Still more specifically, the toggle switch such as 128 may be utilized to set the selected period of time for the yellow light in the center light housing 24' to flash for either approximately five seconds or approximately ten seconds. It will be similarly be appreciated that, as for the embodiment illustrated in FIG. 2, the yellow lights in the outer light housings 26' may be designed to flash either simultaneously or, alteratively, in wig-wag fashion. In this connection, the toggle switch such as 132 can be utilized to set the selected period of time for the yellow lights in the outer light housings 26' to flash for either approximately twenty seconds or approximately thirty seconds.

As for another unique aspect of the invention herein described, the traffic control system may be provided in a package as a kit. The light housings such as 24 and 26 then each have an opening such as 24*a* and 26*a* covered by a removable colored lens, and the kit may be such that the lenses 34 include at least three (3) yellow lenses so the traffic control system can be configured as illustrated in FIG. 2 and at least two (2) red lenses so that the traffic control system can be configured as illustrated in FIG. 1. Still additionally, the kit will include a pair of signs having warning information for vehicular and/or pedestrian traffic disposed on one side thereof.

In this connection, the signs will comprise a stop here on red sign (see 44 in FIG. 1) and an international fire truck crossing sign (see 44' and 144 in FIG. 2). Thus, the colored lenses 34 of the traffic signal assembly such as 22 include a yellow lens for each of the light housings such as 24 and 26 for transmitting a yellow light therefrom in a warning mode or deployment (see the traffic signal assembly 22 as configured in FIG. 2) or a yellow lens for transmitting a yellow light from the center light housing such as 24 and a red lens for transmitting a red light from each of the outer light housings such as 26 in a stop mode or deployment (see the traffic signal assembly 22 as configured in FIG. 1). As will be appreciated, the lights are operable in a manner which ix determined by settings in the programmable central control panel such as 58.

As for other aspects of the present invention, the sign light 56 is preferably wired so as to be illuminated throughout an operation cycle. However, it is only illuminated in the event that the photocell 60 determines that the instantaneous light conditions are such as to require sign illumination. At all other times, the sign light 56 will not be caused to illuminate during an operation cycle in order to preserve the capacity of the battery 50.

As for the verification light 70, it will function during every operation cycle in order to give the driver of a fire department or rescue vehicle an immediate way of determining whether the traffic control system is fully operational. It is set to flash at a rate of one flash per second in the event that the lights in the light housings such as 24 and 26 are operating properly but, if the light in the light housing such as 24 is not illuminated, the verification light 70 will flash at a rate of two flashes per second and then will discontinue operation for a period of one to one and one-half seconds whereas if one of both of the lights in the outside light housings such as 26 are not operating the verification light 70 will then be continuously illuminated. By orienting the verification light 70 so as to be directed toward the path or exit of a fire department or rescue vehicle, the driver of such a vehicle can rapidly assess the operating condition of the traffic signal assembly such as 22.

As will not be appreciated, the modular nature of the traffic control system is of considerable importance. It minimizes down time in the event of a malfunction inasmuch as a programmable central control panel such as 58 can readily be replaced in the field, as can any of the other components, in a minimum of time by inexperienced personnel. In addition, the initial installation is inexpensive and does not require any special training.

Figure 13:
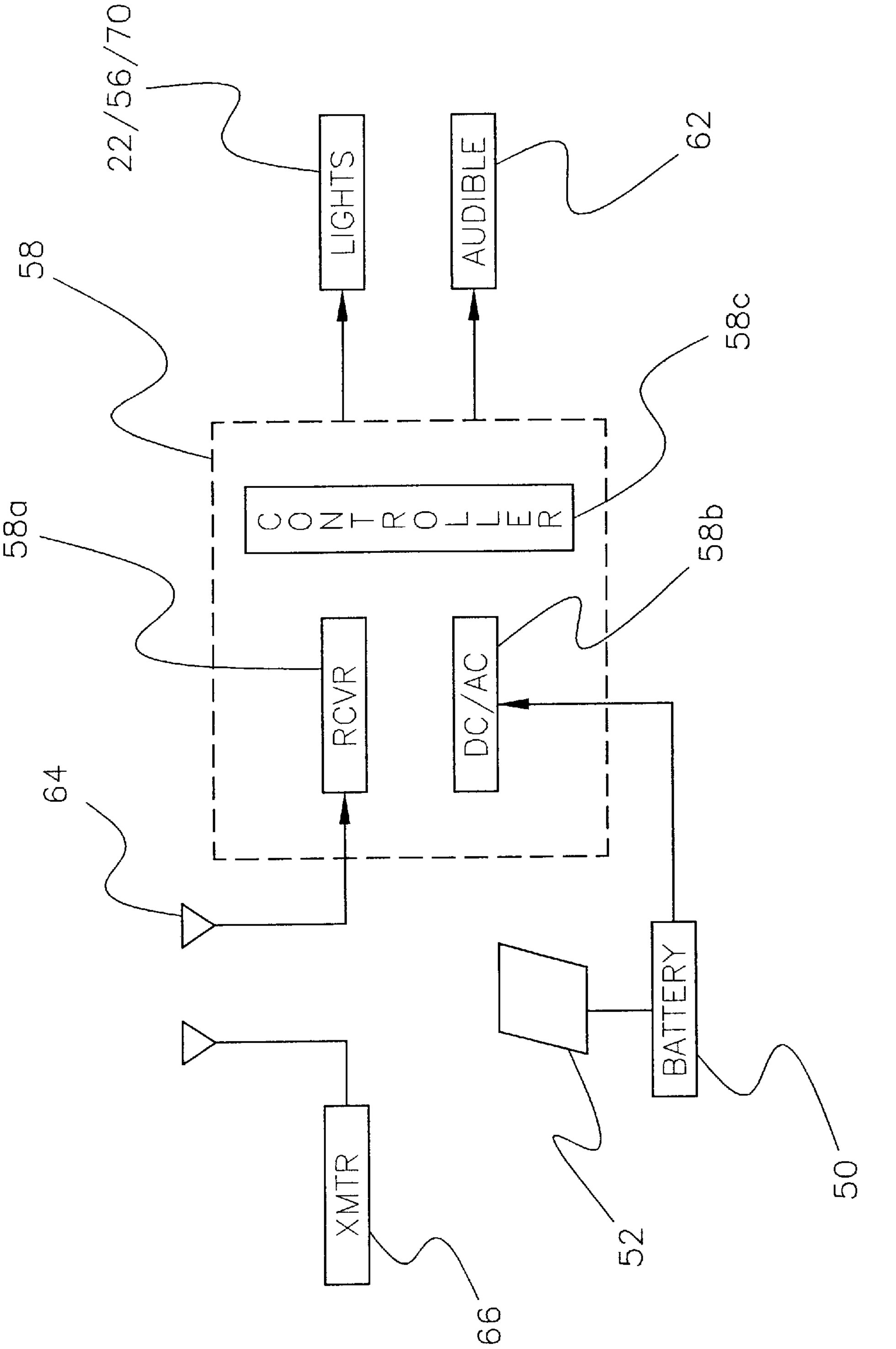
FIG. 13 illustrates a block diagram according to the present invention.

As discussed above, and as illustrated in FIG. 13, the transmitter 66, which is shown in FIGS. 11 and 12 and which may be located at a remote location, transmits remote control signals to the programmable central control panel 58. These control signals are received by the antenna 64. The programmable central control panel 58 includes a receiver 58*a,* which is connected to the antenna 64 for receiving the signal transmitted by the transmitter 66, a direct current (DC) to alternating current (AC) converter 58*b,* and a controller 58*c*. In response to the output of the receiver 58*a,* the programmable controller 58*c* may be arranged to control the lights of the traffic signal assembly 22, the sign light 56, the verification light 70, and the audible device 62 in accordance with the present invention.

Also as discussed above, and as shown in FIG. 13, the solar panel 52 is connected to the battery 50, which may operate through the direct current to alternating current converter 58*b* of the programmable central control panel 58, in order to provide power to the various electrical components of the present invention.

Figure 14A:
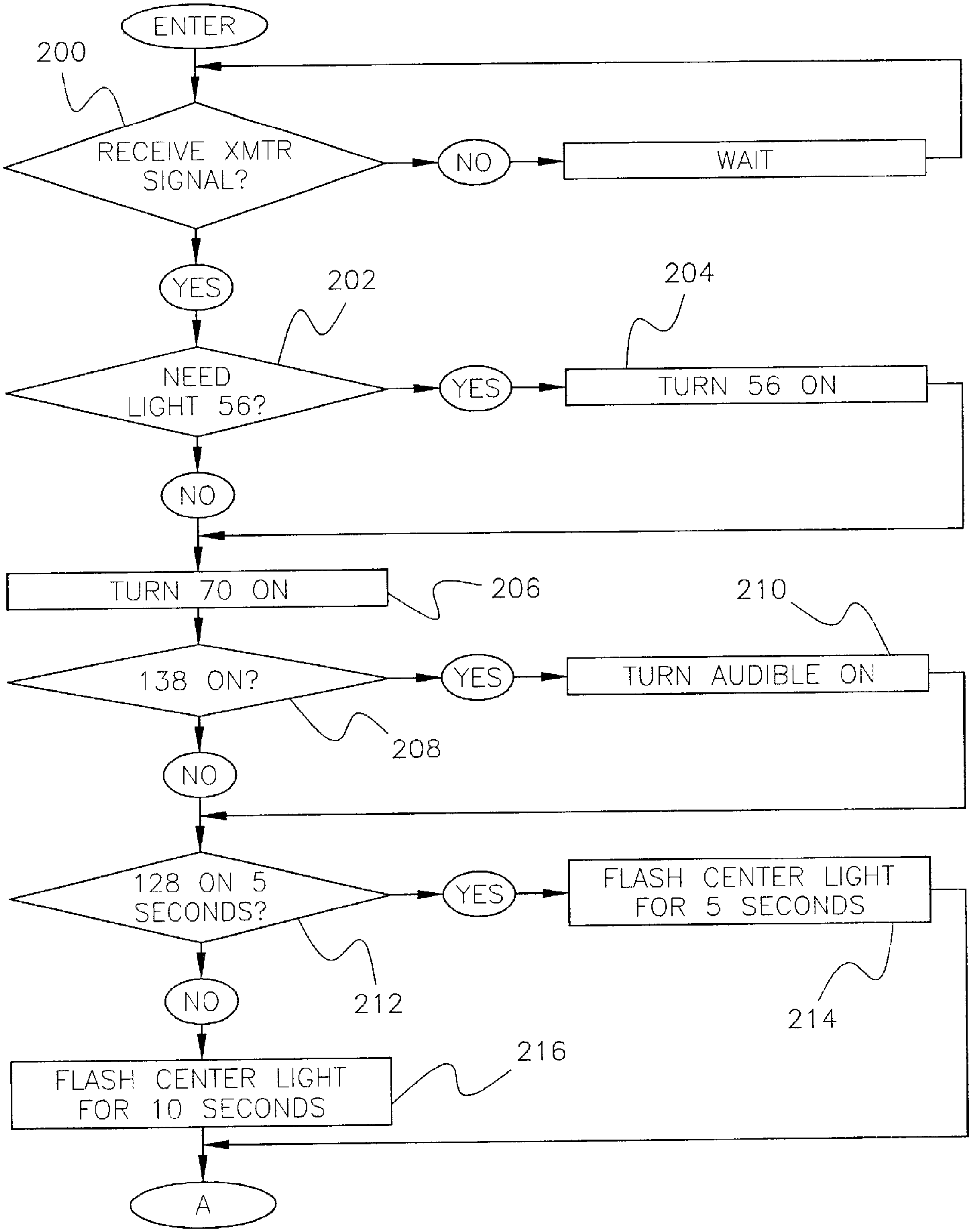
FIGS. 14A and 14B illustrate a flow chart in accordance with the principles of the present invention.
Figure 14B:
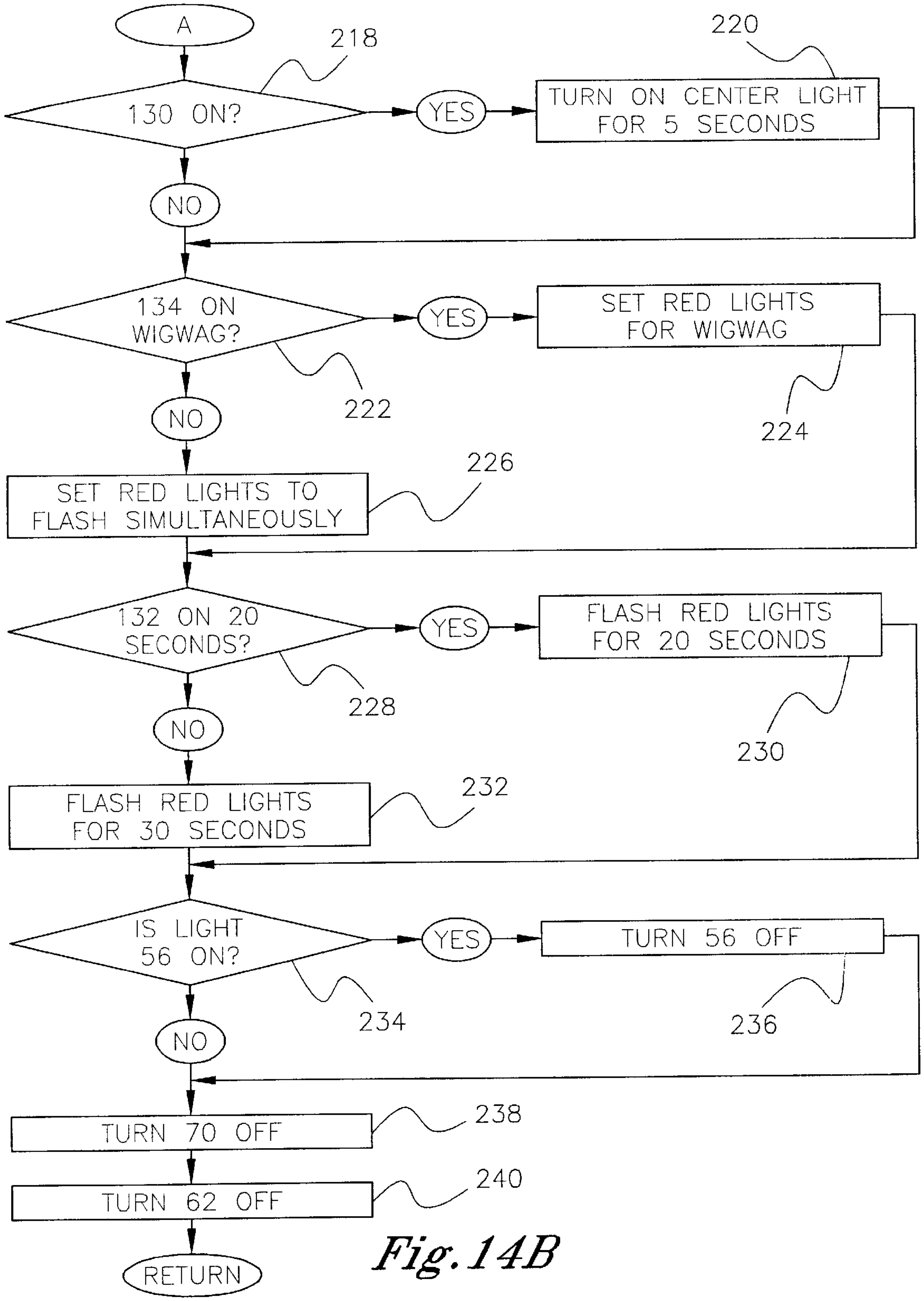

The programmable central control panel 58 may be programmable in accordance with a program represented by the flow chart shown in FIGS. 14A and 14B. When the program is entered, a block 200 tests the output of the antenna 64 and the receiver 58*a* to determine whether or not the programmable central control panel 58 has received a signal from the transmitter 66. If the block 200 determines that the programmable central control panel 58 has not received a signal from the remote transmitter 66, the program waits.

When the block 200 determines that the programmable central control panel 58 has received a signal from the remote transmitter 66, determines whether light conditions are such that the sign light 56 should be energized. If the block 202 determines that the sign light 56 should be energized, a block 204 turns on the sign light 56. After the block 204 turns on the sign light 56, or if the block 202 determines that the sign light 56 should not be on, a block 206 turns on the verification light 70 to indicate that a signal has been transmitted by the transmitter 66 and has been received by the programmable central control panel 58. Additionally, the block 206 may include a test to ensure that the verification light 70 is not operated until the traffic signal assembly 22 is properly operating.

After the block 206 turns on the verification light 70, a block 208 tests the toggle switch 138 to determine whether the toggle switch 138 is in its on position. If the block 208 determines that the toggle switch 138 is in its on position, a block 210 causes the audible alarm 62 to be energized. If the block 208 determines that the toggle switch 138 is not in its on position, or after the audible alarm 62 has been energized by the block 210, a block 212 tests the toggle switch 128. If the toggle switch 128 is in a first position indicating that the yellow light in the center light housing of the traffic signal assembly 22 should flash for five seconds, a block 214 causes the yellow light in the center light housing of the traffic signal assembly 22 to flash for five seconds. Otherwise, a block 216 causes the yellow light in the center light housing of the traffic signal assembly 22 to flash for ten seconds.

After the block 214 causes the yellow light in the center light housing of the traffic signal assembly 22 to flash for five seconds, or after the block 216 causes the yellow light in the center light housing of the traffic signal assembly 22 to flash for ten seconds, a block 218 tests the toggle switch 130 to determine whether the toggle switch 130 is in its on position. If the toggle switch 130 is in its on position, a block 220 turns the yellow light in the center light housing of the traffic signal assembly 22 on continuously for five seconds.

After the block 220 turns the yellow light in the center light housing of the traffic signal assembly 22 on continuously for five seconds, or if the block 218 determines that the toggle switch 130 is not in its on position, a block 222 tests the toggle switch 134. If the toggle switch 134 is in a first position indicating that the red lights in the outer light housings of the traffic signal assembly 22 should be controlled in a wig-wag fashion, a block 224 sets the red lights in the outer light housings of the traffic signal assembly 22 to be operated in a wig-wag fashion. If the toggle switch 134 is in a second position indicating that the red lights in the outer light housings of the traffic signal assembly 22 should be controlled simultaneously, a block 226 sets the red lights in the outer light housings of the traffic signal assembly 22 to flash simultaneously.

After the block 224 sets the red lights in the outer light housings of the traffic signal assembly 22 to be operated in a wig-wag fashion, or after the block 226 sets the red lights in the outer light housings of the traffic signal assembly 22 to flash simultaneously, a block 228 tests the toggle switch 132 to determine if the toggle switch 132 has been operated to its twenty second setting. If the block 228 determines that the toggle switch 132 is at its twenty second setting, a block 230 causes the red lights in the outer light housings of the traffic signal assembly 22 to flash for twenty seconds either simultaneously or in a wig-wag fashion as determined by the toggle switch 134. On the other hand, if the toggle switch 132 is not at its twenty second setting, a block 232 causes the red lights in the outer light housings of the traffic signal assembly 22 to flash for thirty seconds either simultaneously or in the wig-wag fashion as determined by the toggle switch 134.

After the block 230 causes the red lights in the outer light housings of the traffic signal assembly 22 to flash for twenty seconds, or after the block 232 causes the red lights in the outer light housings of the traffic signal assembly 22 to flash for thirty seconds, a block 234 determines whether the sign light 56 is on. If the block 234 determines that the sign light 56 is on, a block 236 turns the sign light 56 off. After the block 236 turns off the sign light 56, or if the block 234 determines that the sign light 56 is not on, a block 238 turns off the verification light 70, and a block 240 turns off the audible alarm 62.

Figure 15:
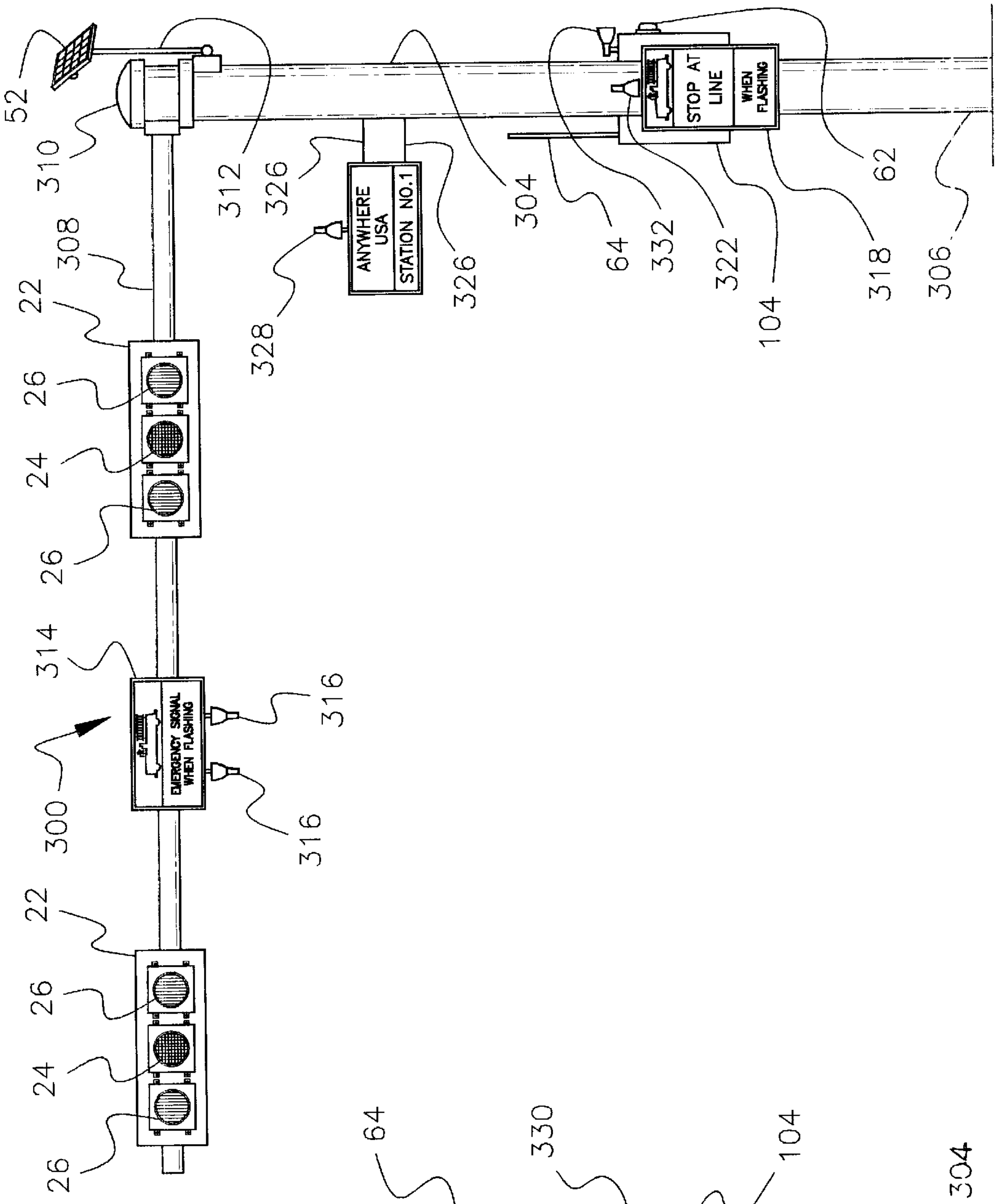
FIG. 15 is a front elevational view of a preferred embodiment of the present invention.
Figure 17:
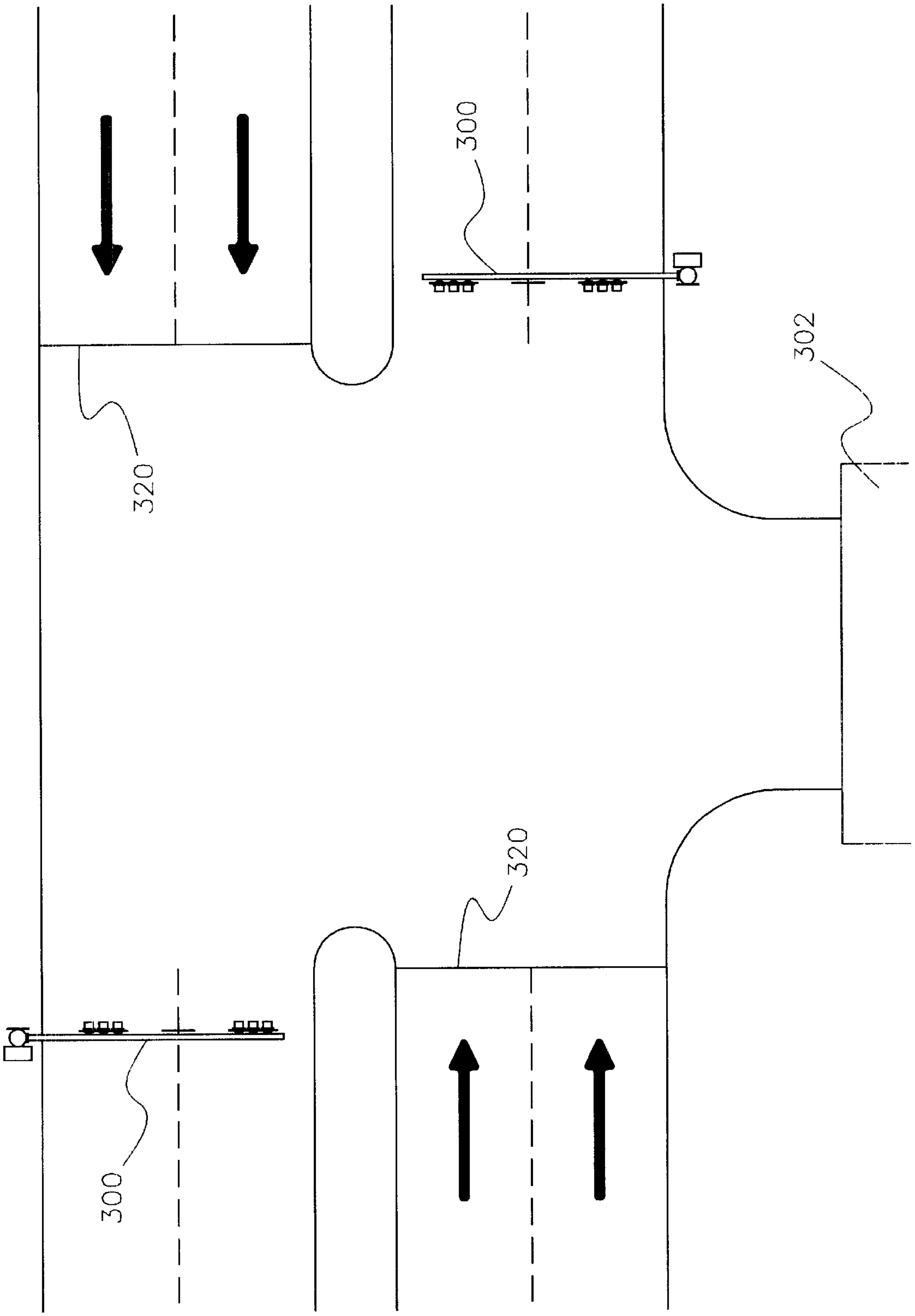
FIG. 17 is a top plan view of a street illustrating the employment of a pair of preferred traffic control systems of the present invention.

Referring to FIG. 15, a traffic control system 300 is shown used which is a preferred system to be employed in a vehicular multi-lane configuration. More specifically, system 300 is used in multi-lane configurations where two or more lanes are used for the movement of vehicular traffic in two oncoming directions (see FIG. 17). Traffic control system 300 employs a plurality of signal assemblies 22 of the same configuration of those seen in the single pole mounted configuration of system 20 (see FIG. 1). The number of signal assemblies 22 employed is proportional to the number of traffic lanes that are to be controlled. For instance, as shown in FIG. 17, two signal assemblies 22 are employed for each traffic control system 300 since two lanes of traffic are to be controlled in each direction, However, if three lanes are to be controlled in each or either direction, three signal assemblies 22 would be used on traffic control system 300. It is further noted that a pair of traffic controlled systems 300 are shown in FIG. 17 since two directions of traffic are being controlled. The two traffic control systems 300 are used to control vehicular traffic in order that rescue vehicles (not shown) exiting a rescue station 302 can enter the roadway safely.

With continuing reference to FIG. 15, the traffic control system 300 includes a vertical pole 304 mounted to a ground surface at a lower end 306. A horizontal pole 308 mounts at a right angle to the vertical pole 304 at an upper end 310. Solar panel 52 mounts by a short pole 312 to the vertical pole upper end 310 and is electrically coupled to the battery 50 and the programmable central control panel 58, both enclosed within the control box 104, in the same manner as system 20 of FIG. 1. As such, it will appreciated that an antenna 64, mounted on the control box 104 (see FIG. 16), is also electrically coupled to the programmable central control panel 58 for receiving a wireless signal transmitted from the rescue station 302.

As shown in FIG. 15, a pair of signal assemblies 22 are mounted along the horizontal pole 308 such that one assembly is each mounted above a lane of traffic (see FIG. 17). Disposed therebetween is a first traffic sign assembly 314 having emergency vehicle warning information printed thereupon. In particular, first traffic sign assembly 314 can read to say "Emergency Signal When Flashing" and further include an icon of a rescue. A first set of lights 316 are further employed below the first sign assembly 314 to illuminate the warning information at nighttime. In the preferred embodiment, a pair of lights 316 are employed. Lights 316 are electrically connected to a photocell (not shown) and the battery 50. The photocell operates to turn the lights 316 on and off depending on the amount of natural light present around the lights 316. The battery 50 provides power to the lights 316.

With continuing reference to FIG. 15, it is shown that a second sign assembly 318 is mounted to the vertical pole 304 providing additional warning information. In particular, the second sign assembly 318 can read to say "Stop at Line When Flashing" and include an icon of a rescue vehicle. This information is meant to direct oncoming vehicular traffic to stop at line 320 (see FIG. 17) when the traffic control system 300 is operating thereby halting the traffic at a location which permits the rescue vehicles to safely exit rescue station 302. The second sign assembly 318 can be illuminated by a light 322 mounted directly thereabove. Light 322 is also electrically coupled to a photocell (not shown) and the battery 50. The photocell operates to turn light 322 on and off depending on the amount of natural light present around light 322 while the battery 50 provides power to light 322.

As shown in FIG. 15, a third sign assembly 324 is mounted to the vertical pole 304 in a horizontal direction and parallel to the horizontal pole 308. The third sign assembly 324 provides information to the vehicular traffic relating to rescue station 302 to which the traffic control system 300 is employed. For instance, the third sign assembly 324 can display the city name in which rescue station 302 is located ("Anywhere, U.S.A.") and further indicate the designation number of the particular rescue station 302 (i.e., "Station No. 1"). The third sign assembly 324 can be illuminated by a light 328 mounted directly thereabove. Light 328 is also electrically coupled to a photocell (not shown) and the battery 50. The photocell operates to turn light 328 on and off depending on the amount of natural light present around light 328 while the battery 50 provides power to light 328. In the preferred embodiment, the third sign assembly 324 is mounted to the vertical pole 304 by a pair of brackets 326.

Figure 16:
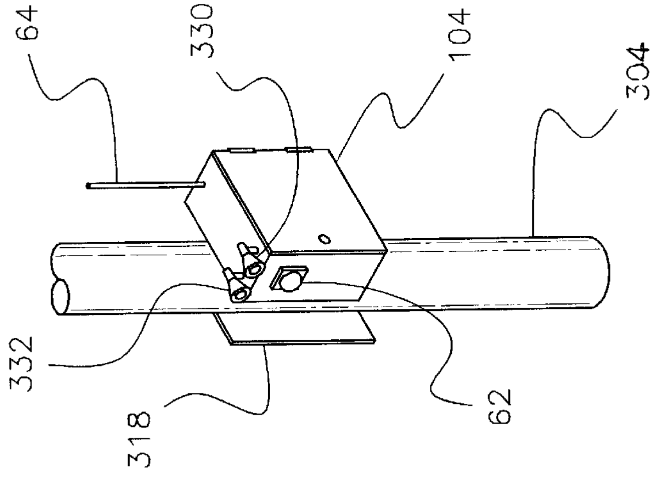
FIG. 16 is a rear perspective view of the programmable central control panel employed with the preferred embodiment of FIG. 15.

Referring to FIG. 16, it is shown that a control box 104 is mounted to the vertical pole 304 directly behind the second sign assembly 318. The control box 104 encloses the programmable central control panel 58 and the battery 50 in the same manner as described above with system 20. However, traffic control system utilizes a pair of verification lights, designated as first verification light 330 and second verification light 332. Both verification lights, 330 and 332, are directed at the rescue station 302 and are used to confirm the proper operation of traffic control system 300. It is first understood that each sign assembly 22 is configured and therefore operates in the same manner as those employed in system 20.

In traffic control system 300, the first verification light operates in the same manner as verification light 70 of system 20. That is, if first verification light 330 flashes 54 times a minute, then traffic control system 300 is operating properly. If first verification light 330 flashes 108 times a minute, then the bulb in the center light housing 24 (the yellow lens) is burnt out. If first verification light 330 is continuously on ("steady on"), then one of the bulbs in either of the outer light housings 26 (red lens) is burnt out.

The second verification light 332 is used to verify that the bulbs in the outer light housings 26 (red lenses) are illuminated. When the second verification light 332 produces a white flood, then the operator of a rescue vehicle exiting the rescue station 302 has an indication that the red wig-wag sequence has commenced.

Equivalent elements can be substituted for the ones set forth above such that they perform the same function in the same way for achieving the same result.

Having thus described the invention what is claimed and desired to be secured by Letters Patent is:

1. An emergency vehicle traffic control system having a front side and comprising:

a) a vertically disposed pole having a lower and upper end, the lower end perpendicularly mounted to a ground surface proximal to a vehicular roadway;

b) a horizontally disposed pole mounted to the vertically disposed pole upper end at a right angle, the horizontally disposed pole extending out over the vehicular roadway;

c) at least one traffic signal assembly, each including a backboard having three openings formed therethrough, three light housings positioned within the three backboard openings, three light receptacles located at generally middle portions within the three light housings and three light bulbs electrically coupled to the three light receptacles, each traffic signal assembly mounted to the horizontally disposed pole;

d) a battery for supplying electrical power to the emergency vehicle traffic control system;

e) a solar panel for gathering solar energy and energizing the battery;

f) at least one traffic sign assembly positioned on the front side of the emergency vehicle traffic control system;

g) a programmable central control panel for initiating a light bulb illumination sequence in response to a wireless signal transmitted from a remote location, the programmable central control panel electrically coupled to the battery and the traffic signal assembly; and h) at least one verification light positioned upon the emergency vehicle traffic control system providing a visual indication to an emergency vehicle operator emerging from the remote location that the traffic signal assembly is operating properly, the verification light electrically coupled to the battery.

2. The emergency vehicle traffic control system of claim 1, wherein a pair of traffic signal assemblies are employed, each backboard of each assembly horizontally disposed along the horizontally disposed pole.

3. The emergency vehicle traffic control system of claim 1, further comprising:

a) the at least one traffic sign assembly having vehicular and pedestrian warning information affixed on a front side thereof, and b) at least one sign light mounted proximal to each at least one traffic sign assembly for illuminating the warning information in low and no light environments, each sign light electrically coupled to the programmable central control panel and the battery.

4. The emergency vehicle traffic control system of claim 3, wherein a first and second traffic sign assembly are employed, the first assembly mounted along the horizontally disposed pole and the second assembly mounted along the vertically disposed pole.

5. The emergency vehicle traffic control system of claim 3, further comprising a photocell electrically coupled to the programmable central control panel and the at least one sign light, the photocell continuously measuring light conditions around the emergency vehicle traffic control system and permitting the at least one sign light to be illuminated when a minimum light level threshold has been exceeded.

6. The emergency vehicle traffic control system of claim 1, further comprising an audible alarm operatively associated with the programmable central control panel for producing an audible signal in conjunction with the light bulb illumination sequence.

7. The emergency vehicle traffic control system of claim 1, further comprising:

a) an RF antenna mounted proximally and electrically coupled to the programmable central control panel;

b) an RF receiver mounted proximally and electrically coupled to the programmable central control panel; and c) an RF transmitter positioned in a remote location for sending an RF signal to the programmable central control panel, the RF transmitter including a three position toggle switch having a first center-off position, a second lights-only position and a third lights and bells position.

8. The emergency vehicle traffic control system of claim 1, further comprising:

a) three colored lenses, one each positioned in each of the three light housings covering each light bulb positioned therewithin, and b) three lens hoods, one each attached to a front side of each of the three light housings for concentrating the light emanating therefrom.

9. The emergency vehicle traffic control system of claim 8, further comprising:

a) the three light housings horizontally disposed providing a center light housing and pair of outer light housings;

b) a yellow colored lens employed within the center light housing; and c) a red colored lens employed in each of the pair of outer light housings.

10. The emergency vehicle traffic control system of claim 9, wherein the light bulb illumination sequence comprises three successive phases including a first phase wherein the center housing light bulb flashes for a pre-determined time period while the pair of outer housing light bulbs fail to illuminate, followed by a second phase wherein the center housing light bulb illuminates for a pre-determined time period followed by a pre-determined time period of no illumination while the pair of outer housing light bulbs fail to illuminate, followed by a third and final phase wherein the center housing light bulb fails to illuminate while the pair of outer housing light bulbs alternatively flash for a pre-determined time period.

11. The emergency vehicle traffic control system of claim 8, further comprising:

a) the three light housings horizontally disposed providing a center light housing and pair of outer light housings; and b) a yellow colored lens employed in each of the three light housings.

12. The emergency vehicle traffic control system of claim 11, wherein the light bulb illumination sequence comprises three successive phases including a first phase wherein the center housing light bulb flashes for a pre-determined time period while the pair of outer housing light bulbs fail to illuminate, followed by a second phase wherein all three light bulbs fail to illuminate for a pre-determined time period, followed by a third and final phase wherein the center housing light bulb fails to illuminate while the pair of outer housing light bulbs alternatively flash for a pre-determined time period.

13. The emergency vehicle traffic control system of claim 1, further comprising a control box for enclosing the programmable central control panel, the programmable central control panel including a plurality of toggle switches and a first and second meter, the plurality of toggle switches for setting predetermined time periods associated with the light bulb illumination sequence, the first meter providing a visual indication of a solar charge associated with the solar panel and the second meter providing a voltage level associated with the battery.

14. The emergency vehicle traffic control system of claim 1, wherein the at least one verification light comprises a first and second verification light, each mounted along the vertically disposed pole.

15. The emergency vehicle traffic control system of claim 14, wherein the first and second verification lights operate a verification sequence wherein the first verification light notifies the emergency vehicle operator whether the emergency traffic control system has received a signal and is operating properly and whether any of the light bulbs have failed to illuminate and the second verification light notifies the emergency vehicle operator that the light bulb illumination sequence has reached a point within the sequence which commands vehicular traffic that it must come to a complete stop.

* * * * *